United States Patent [19]

Colman

[11] 3,761,632

[45] Sept. 25, 1973

[54] AUTOMATIC TELEPHONE ALARM SYSTEM RESPONSIVE TO ANSWERING OF THE CALLED TELEPHONE

[75] Inventor: Robert Colman, New York, N.Y.

[73] Assignee: General Alarm Corporation, New York, N.Y.

[22] Filed: Dec. 15, 1971

[21] Appl. No.: 208,113

[52] U.S. Cl. .......... 179/5 P

[51] Int. Cl. .......... H04m 11/04

[58] Field of Search .......... 179/5 R, 5 P, 18 BD, 179/18 BE

[56] References Cited

UNITED STATES PATENTS

| | | | |
|---|---|---|---|
| 3,519,745 | 7/1970 | Colman | 179/5 R |
| 3,409,741 | 11/1968 | Odom | 179/18 BE |
| 3,544,722 | 12/1970 | Hartfield | 179/5 P |
| 3,582,555 | 6/1971 | Kok | 179/5 R |
| 3,369,079 | 2/1968 | Glidden | 179/5 R |

OTHER PUBLICATIONS

Engineering Electronics, John D. Ryder, 1967 by McGraw-Hill Inc. pp. 583–586.

*Primary Examiner*—Kathleen H. Claffy
*Assistant Examiner*—David L. Stewart
*Attorney*—Joseph M. Fitzpatrick et al.

[57] ABSTRACT

An automatic telephoning system such as for broadcasting fire or burglary messages to preselected telephones and responsive to the interruption of the regular sequence of ringback signals following dialing of a telephone number to sense the answering of the called telephone and to begin the playout of a prerecorded message.

9 Claims, 3 Drawing Figures

AUTOMATIC TELEPHONE ALARM SYSTEM RESPONSIVE TO ANSWERING OF THE CALLED TELEPHONE

This invention relates to telephoning systems, and more particularly it concerns novel arrangements for automatically playing a prerecorded message upon the answering of an automatically dialed number.

The present invention is particularly useful in connection with telephone alarm systems of the type shown and described in U. S. Pat. No. 3,519,745. The systems therein described respond to the occurrence of an alarm situation, e.g., fire or burglary. When a fire or burglary is detected, the system automatically dials calls to various telephones according to a programmed sequence; and then it plays an alarm message to each of the stations or telephones called. One feature of the invention disclosed in the aforementioned patent is that the sequence of calls may be adjusted according to whether certain of the called telephones actually answer. For example, in a burglary situation, the initially programmed sequence of telephones to be called may comprise a police telephone followed by a private agency telephone. If, however, one of these called telephones fail to answer, the program may adjust to place an additional call to a third telephone, e.g., the operator at a central exchange.

The present invention provides improved operation in automatic telephoning systems in that it causes the prerecorded message to begin playout when the called telephone is answered. In the past, this control could not be attained; and instead, only the following three alternatives were available:

Firstly, the prerecorded playout could begin immediately upon completion of dialing. The difficulty with this is that the person answering at the called telephone would perhaps miss part of the message. The message could, of course, be made repeatable so that the person answering would receive the entire message if he waited until the message repeated. This, however, is quite time consuming; and further, it requires recording and playback equipment which is larger and more expensive than that required for a non-repeating message playout.

Secondly, the prerecorded playout could be made to begin after a predetermined time interval following completion of the dialing operation. For example, if the system were designed to give the called telephone the time interval of nine rings within which to answer, the message playout could be set to begin after sufficient time had elapsed following dialing to allow nine rings to occur. This procedure, however, is undesirable because should the called telephone be answered afer only one or two rings, the party answering would have to wait a considerable length of time before the recorded message is played out to him. He may, in fact, hang up before the message is played, thinking that he received a false call.

Thirdly, the telephones to be called could be provided with special signal transmitting devices which, when the telephone is answered, would send a trigger signal back to the telephoning device causing it to begin playout of the prerecorded message. This last-described technique is undesirable because it requires extra equipment and consequently the system is expensive and requires special maintenance.

The present invention has none of the disadvantages mentioned above in connection with prior systems. With the present invention, a prerecorded message is automatically played out to a called telephone as soon as that telephone is answered, irrespective of whether the called telephone is answered after the first ring or after any subsequent ring. No special equipment is required at the called telephone and the extra equipment needed at the calling telephone is minimal and inexpensive.

According to the present invention, the ringback signals which are heard in the calling telephone are monitored; and when an interruption occurs in their regular sequence, as when the called telephone is answered, this interruption results in the production of a triggering signal which initiates the playout of a prerecorded message to the called telephone.

As illustratively embodied, the invention also provides for automatic sequencing to the dialing of a subsequent number if the called telephone is not answered. In this case, the prerecorded message is not played out at all to the non-answered telephone.

The present invention also provides, according to one aspect thereof, novel circuit arrangements for monitoring ringback signals and for controlling message playout and subsequent calling based on the monitored ringback signals.

There has thus been outlined rather broadly the more important features of the invention in order that the detailed description thereof that follows may be better undersood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

A specific embodiment of the invention has been chosen for purposes of illustration and description, and is shown in the accompanying drawings, forming a part of the specification, wherein.

Figure 1:
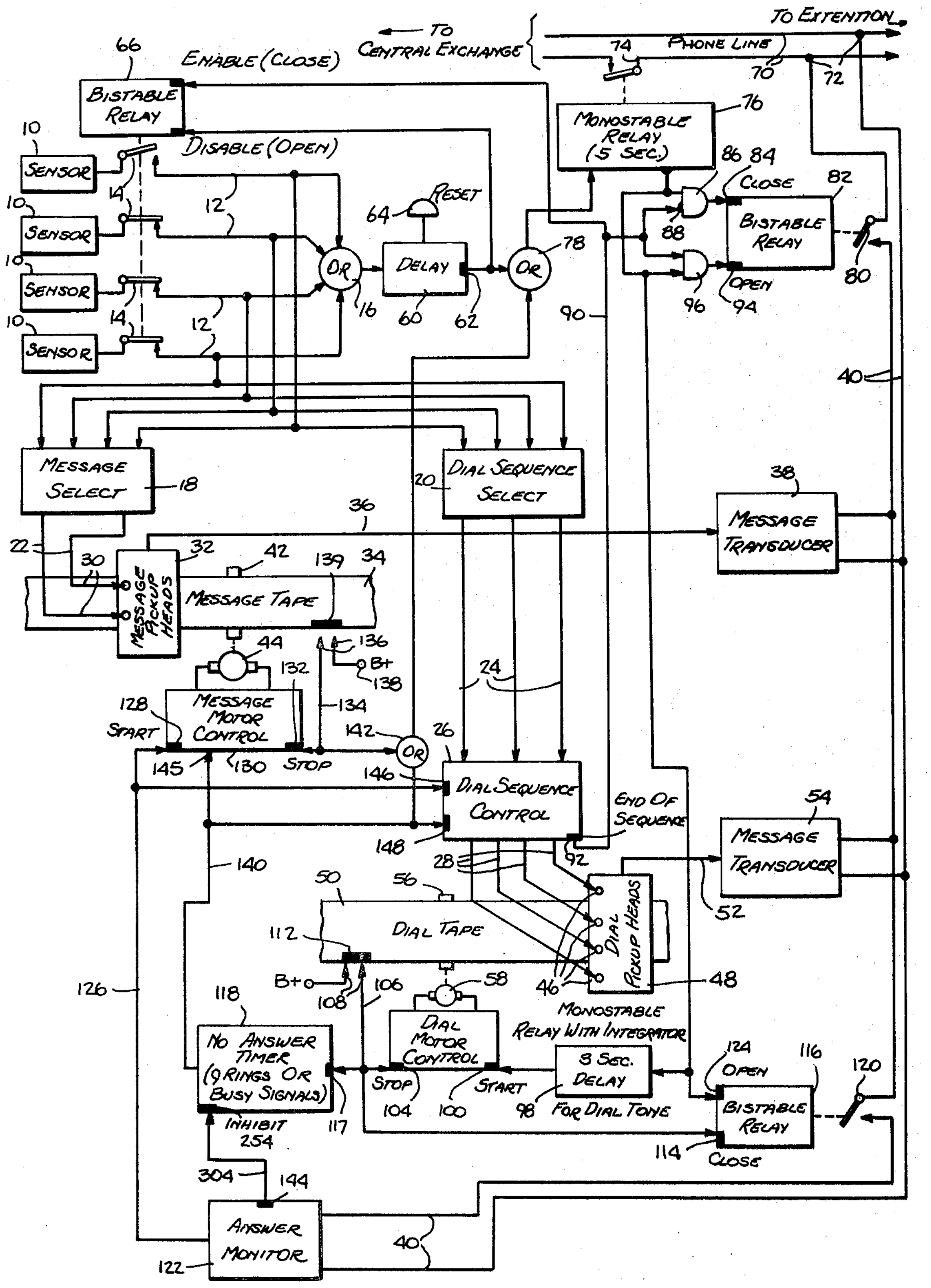
FIG. 1 is a schematic diagram of an alarm telephone system in which the present invention is embodied.

The alarm telephoning system of FIG. 1 minitors several locations for the occurrence of fire, attempted illegal entry, or other condition to be detected. When such condition occurs, the system selects an appropriate prerecorded message and an appropriate sequence of telephones to be called. The system then automatically dials the first telephone in the selected sequence and monitors the resulting ringback signals for an indication that the called telephone has been answered. When such indication occurs, the system plays out the selected prerecorded message over the telephone line to the called telephone. Upon completion of the playout, the system effects a hangup condition on the telephone line and then dials the next telephone in the selected sequence. If the called telephone is not answered within a predetermined time following dialing, then the system automatically progresses to dial the next telephone in the selected sequence without message playout to the non-answered telephone. The selected sequence itself may be adjusted to call more, less or different telephones, depending upon whether earlier called telephones are answered or not. Upon completion of message playout to the last dialed telephone, or upon receipt of an indication that that telephone has not been answered, the system is reset to its origial state.

As shown in FIG. 1, there are provided a plurality of sensors 10 which respond to predetermined conditions to produce electrical signals on alarm lines 12. These sensors may include pressure sensing devices arranged on doors or windows and set to operate an electrical switch when an attempt is made to force the door or window open. The sensors may also include thermostats or smoke sensing devices which are set to operate an electrical switch upon the occurrence of heat or smoke to indicate a fire.

The alarm lines 12 are connected via associated disable relay contacts 14 to a common OR gate circuit 16. The alarm lines 12 are also each connected, beyond the relay contacts 14, to associated terminals of a message select unit 18 and a dial sequence select unit 20.

Depending upon the particular sensor which is activated, a signal will be applied to a particular input terminal of the message select unit 18 and a particular input terminal of the dial sequence select unit 20. These units then produce signals upon appropriate message and dial sequence control lines 22 and 24 to cause the playing of an appropriate message to an appropriate series of telephones. For example, if the particular sensor which is activated should be a heat sensor, it would apply signals to the message select unit 18 which would cause the playout of a fire alarm message, and it would apply signals to the dial sequence select unit which would direct a series of calls, for example, first to the nearest fire station, then to the police station and finally to a special station such as a private agency. On the other hand, if the particular sensor which is activated should be a presssure sensor which detects an attempted forced illegal entry, then it would, through the message select unit 18, cause the playout of a burglary alarm message, and through the dial sequence select unit 20, direct a series of calls, for example, first to the nearest police station and then to a private detective agency. The message select unit 18 may comprise simply a bistable switching arrangement which causes voltage signals to appear upon one or another of the message control lines 22. A similar switching arrangement may be used in the dial sequence select unit 20. It will be understood that additional messages and additional sequences may be provided according to the particular circumstances; and in such case, additional switching would be provided in the message select and dial sequence select units 18 and 20. Correspondingly, additional control lines 22 and 24 would also be provided.

The dial sequence control lines 24 are connected to corresponding input terminals of a dial sequence control unit 26. This control unit operates to produce signals on selected dial control lines 28 in a particular sequence. The sequence is selected by the activation of one or another of the dial sequence control lines 24. The dial sequence control unit 26 amy comprise a group of stepping switches which move together in stepwise fashion upon completion of each telephone call so as to activate a different one of the dial control lines 28. Each of the dial control lines 28 corresponds to a different telephone number to be dialed. Thus, when one of the stepping switches in the dial sequence control unit 26 is put into operation by activation of one of the dial sequence control lines 24, a certain group of the dial control lines 28 will be activated in a particular order to effect dialing of a first given group of telephones in a given sequence. When a different alarm condition is sensed, a different one of the dial sequence control lines 24 is activated to put a different one of the stepping switches of the dial sequence control unit into operation. This, in turn, causes a different group of the control lines 28 to be activated in its own particular sequence.

An example of an arrangement for activating different message control lines and different dial control lines, is given in the aforementioned U. S. Pat. No. 3,519,745. Inasmuch as the present invention is not concerned with the specific operation of these units, they are not described in detail herein.

The message control lines 22 are connected to activate corresponding message signal pickup heads 30. The pickup heads are mounted in a common message pickup unit 32 adjacent a multi-track magnetic message tape 34. The message tape may be in a cassette or other well-known arrangement. Preferably, it is in the form of an endless loop so that it may be replayed without having to be rewound. Each of the pickup heads 30 is positioned adjacent a corresponding prerecorded track on the tape so that, as the tape moves, the particular pickup head which has been activated by its associated message control line 22, will pick up the message which has been recorded on its adjacent track. This message is transmitted via a common message line 36 to a message transducer 38 which introduces the message signals onto a telephone line 40.

The message tape 34 is driven via a capstan 42 by a message motor 44. The means for controlling operation of the message motor 44 will be described hereinafter.

The dial control lines 28 are connected to activate corresponding dial signal pickup heads 46. These pickup heads are mounted in a common dial signal pickup unit 48 adjacent a multi-track magnetic dial signal tape 50. This tape may be similar to the message tape 34; and as such, it is provided with a plurality of tracks, each prerecorded with signals corresponding to a different telephone number to be dialed, and each being located adjacent a different one of the pickup heads 46. Thus, as the dial signal tape 50 is moved, the particular pickup head 46, which is activated by its associated dial control line 28, will receive dial signals from the tape and will transmit these signals via a common dial signal line 52 to a dial signal transducer 54. The dial signal transducer 54 then introduces these signals to the telephone line 40.

The dial signal tape 50 is driven via a capstan 56 by a dial motor 58. The operation of the dial motor 58 is controlled by means to be described herenafter.

The common OR gate circuit 16, which receives signals from each of the sensor 10, is connected to a start delay circuit 60. This circuit is a timing device which produces a start signal at a start terminal 62 at a given duration following application of a signal from the OR gate circuit 16. The purpose of the start delay circuit 60 is to provide time for reset of the system to prevent its operation, should a false alarm be discovered. To this end, there is provided a reset button 64, which when pushed, disables the start delay circuit and prevents it from producing a signal at its output terminal.

The various disable relay contacts 14, which are interposed along the alarm lines 12 from the sensors 10, are controlled by a common bistable relay 66. Before the occurrence of an alarm condition, the relay 66 holds the contacts 14 closed so that the sensors 10 may transmit any alarm condition they sense to the system. The relay 66 is connected to be switched to an open contact condition upon the occurrence of a signal at the start terminal 62 of the start delay circuit 60. This prevents the sensors 10 from responding to a subsequent alarm condition once the system has been put into operation.

The telephoning system of FIG. 1 is connected into a telephone trunk line 70. As indicated in the drawing, the trunk line in one direction goes to a central telephone exchange, and in the other direction it goes to various extension telephones (not shown) connected to the line. The telephone line 40, to which the message and dial transducers 38 and 54 are connected, is itself connected, as indicated at 72, across the trunk line 70.

A set of normally closed line clear switch contacts 74 are interposed along one of the trunk lines 70 on the telephone exchange side of the line connections 72. These line clear switch contacts are opened and then reclosed upon energization of a monostable relay 76. The opening of the line clear contacts 74 serves to disconnect any extension telephones from the trunk line 70. This simulates a hangup condition of all extension telephones and thereby makes the trunk lines 70 available for seizure by the alarm telephoning system.

As shown in FIG. 1, the monostable relay 76 receives a signal via a second OR gate circuit 78 connected to the start terminal 62. This signal energizes the relay for a predetermined time period, e.g., five seconds, after which time the relay reverts to an unenergized state. The energization of the monostable relay 76 opens the line clear switch contacts 74 for a duration sufficient to clear the telephone line. Thereafter, the switch contacts close so that the telephone line may be seized by the alarm system.

Line seizure by the telephone alarm system is achieved by closure of a pair of line seize switch contacts 80 interposed along the tleephone line 40. the line seize switch contacts are controlled from a bistable relay 82. The relay has a line close terminal 84 which receives signals from a line close AND-NOT gate circuit 86. These signals activate the relay so that it moves the line seize switch contacts to a closed condition for seizing the telephone line. The AND-NOT gate circuit is connected to receive a signal from the monostable relay 76 upon completion of its energization. This signal passes through the AND-NOT gate circuit 86 to the close terminal 84 of the bistable relay 82. The AND-NOT gate circuit 86 includes an inhibit terminal 88 which, when energized, prevents signals from the monostable relay 76 from passing through to the bistable relay 82. The inhibit terminal 88 is connected via an end of sequence line 90 to an end of sequence terminal 92 on the dial sequence control unit 26. As will be explained more fully hereinafter, the purpose for the inhibit terminal is to prevent line seizure by the alarm system following completion of the last telephone call in a sequence.

The bistable relay also includes an open terminal 94 which receives signals from an AND gate circuit 96. The AND gate circuit, in turn, is connected to receive signals from the monostable relay 76 and the end of sequence line 90; and when these signals occur simultaneously, they pass through the AND gate circuit 96 to the open terminal 94 of the bistable relay 82 causing it to open the switch contact 80 and release the alarm system from the telephone line.

The output signals from the monostable relay 76, which occur each time the relay has completed its energization, are also supplied via a dial tone acquisition timer 98 to a start terminal 100 on a dial motor control circuit 102. The timer 98 delays the initiation of dialing for a short period, e.g., three seconds, which allows for acquisition of a dial tone. The dial motor control circuit 102, which starts and stops operation of the dial motor 58, also includes a stop terminal 104 which is connected to receive signals from a dial motor stop line 106. The dial motor stop line is connected to one of a pair of dial stop brushes 108 which are positioned adjacent the dial signal tape 50. The other one of the brushes 108 is connected to a voltage source 110. An electrically conductive segment 112, dimensioned to bridge the brushes 108, is placed on the tape 50 at a position such that it achieves such bridging to produce a signal on the stop line 106 which the dialing of a telephone number is completed.

The signal from the stop line 106 is applied to the stop terminal 104 of the dial motor control circuit 102 to stop operation of the dial motor 58 when the dialing of a number is complete. The stop signal is also applied to a close terminal 114 of an answer monitor bistable relay 116, and to an imput terminal 117 of a no answer timer 118.

The answer monitor bistable relay 116 operates a switch contact 120 which is arranged to connect an answer monitor 122 into and out of circuit with the alarm telephone line 40. The bistable relay 116 has an open terminal 124 which receives an input from the monostable relay 76 upon completion of its energization. It will be appreciated that when a signal from the monostable relay 76 is supplied to the close terminal of the bistable relay 82 for line seizure and to the dial tone acquisition timer 98 for dial tone acquisition, it is also applied to the open terminal 124 of the answer monitor bistable relay 116 so that the switch contact 120 is open and the answer monitor 122 is disconnected from the telephone line 40. The answer monitor remains so disconnected until a signal on the dial motor stop line 106 occurs upon completion of dialing, at which time the signal is applied to the close terminal 114 of the answer monitor bistable relay 116, causing it to close the switch contact 120 and connect the answer monitor 122 into the alarm system telephone line 40.

The answer monitor 122, which operates in a manner to be described, responds to the answering of a called telephone to produce a signal on an answer line 126. This signal is applied to a start terminal 128 of a message motor control circuit 130. The message motor control circuit is arranged to start and stop operation of the message motor 44, thereby controlling message tape movement, in response to application of signals to its start terminal 128 and to a stop terminal 132, respectively.

The stop terminal 132 of the message motor control circuit 130 is connected to a message motor stop line 134. This line, like the dial motor stop line 106, is connected to one of a pair of brushes 136, which contact the message tape 34. The other brush is connected to a voltage source 138. An electrically conductive segment 139 of sufficient length to bridge the brushes at one position, is provided along one edge of the tape at a location so that it effects such bridging upon completion of a message playout. This results in the production of a signal which is transmitted via the stop line 134 to the message motor stop terminal 132.

The no answer timer 118 produces signals on a no answer line 140; and these signals are transmitted along with signals produced on the message motor stop line 134 to a third OR gate circuit 142; and from there the signals pass through the second OR gate circuit 78 to the monostable relay 76.

The signal outputs from the no answer line 140 are connected to a disable terminal 144 on the message motor control circuit 130 so that the production of a no answer signal prevents the operation of the message motor when the ringback signals cease to occur. Correspondingly, signals are produced on a no answer inhibit line 145 whenever signals are produced on the answer line 126; and the signals on the line 145 are applied to the no answer timer 118 to disable its operation following the answering of the called telephone.

The signals produced by the no answer timer 118 and the answer monitor 122 are also supplied to sequence adjust terminals 146 and 148 on the dial sequence control unit 26. These signals serve to step the sequence along from call to call; and then serve to initiate changes in the sequence based upon whether a previous call was answered or not. The manner in which these signals serve to produce this sequence advance and adjustment is not part of the present invention and will not be discussed in detail herein. An example of how a dialing sequence is advanced and adjusted, based upon the answering or non-answering of called telephones is given in the above-mentioned U.S. Pat. No. 3,519,745.

The telephone alarm system of FIG. 1 operates as follows:

When an alarm condition, e.g., an attempted burglary or a fire, is sensed by one of the sensors 10, it generates a signal on its associated alarm line 12. This signal passes through the common OR gate circuit 16 to the start delay circuit 60. At the same time, the signal is applied to one of the input terminals of both the message select unit 18 and the dial sequence select unit 20. The message select unit 18 produces a signal on one of the message control lines 22 to activate one of the message pickup heads 30 so that an appropriate message will be played out. Similarly, the dial sequence select unit 20 produces a signal on one of its dial sequence control lines 24, causing the dial sequence control unit 26 to activate one of several pre-selected dialing sequences. This causes selected ones of the dial control line 28 to activate corresponding dial signal pickup heads 46 in a predetermined sequence so that selected telephone numbers will be dialed in an appropriate order.

After a predetermined time has elapsed following the application of a start signal to the start delay circuit 60, a signal is produced at its start terminal 62 and applied via the second OR gate circuits 78 to the monostable relay 76. The relay 76 causes the line clear switch contacts 74 to open for a certain duration so that any telephone conversations which were in progress on the telephone trunk line 70 will be terminated and a hangup condition will be effected.

Following this line clear operation, the monostable relay 76 allows the line clear switch contacts 74 to close; and at the same time, it produces signals at one terminal of each of the AND-NOT gate circuit 86 and the AND gate circuit 96. If, at this time, no signal is present on the end of sequence line 90, the output of the monostable relay 76 will pass through the AND-NOT gate circuit 86 to the close terminal 84 of the bistable relay 82. This will cause a bistable relay 82 to close the line seize switch contacts 80, thereby producing an off-hook condition on the telephone line 40 and the trunk line 70 for the telephone alarm system.

The output signal from the monostable relay 76 is, at the same time, applied to the open terminal 124 of the answer monitor bistable relay 116 to open the switch contact 120 and disconnect the answer monitor 122 from the alarm telephone line 40.

The closing of the line clear switch contacts 74 and the line seize contacts 80 results in the telephone alarm system having captured the telephone line and produces an off-hook condition on the line. When this condition occurs, a dial tone will follow which will signal that a number may be dialed. In order to provide sufficient time for this dial tone to occur, the dial tone acquisition timer 98 delays the application of a signal from the monostable relay 76 to the start terminal 100 of the dial motor control circuit 102. At the end of this delay, the signal passes through to the start terminal 100 and causes the dial motor 58 to start. The motor 58 turns the capstan 56, thereby driving the dial tape 50 so that the various dial signal tracks thereon pass under the various dial signal pickup heads 46. The particular dial signal pickup 46, which has been energized from the dial sequence control unit 26, causes the signals from its associated dial tape track to be transmitted via the common dial signal line 50 to the dial transducer 54 which, in turn, introduces these signals to the telephone alarm line 40. As a result, a particular telephone number is dialed.

At the end of the dialing of the first telephone number, the electrically conductive segment 112 on the dial signal tape 50 bridges the dial stop brushes 108, thereby causing a stop signal to appear on the dial motor stop line 106. This signal is applied to the stop terminal 104 of the dial motor control circuit 102 to stop operation of the dial motor 58 and movement of the tape 50. The stop signal on the line 106 is also simultaneously applied to the closed terminal 114 of the answer monitor bistable relay 116, causing it to close the switch contact 120 and connect the answer monitor 122 into the telephone alarm line 40. At the same time, the signal on the dial motor stop line 106 is applied to the no-answer timer 118, causing it to initiate a delay operation corresponding to the duration within which the dialed party is given to answer the dialed telephone.

When the above-described dialing operation is complete, the called telephone begins to ring, and ringback signals are produced on the telephone alarm line 40 from the central exchange. These signals are monitored in the answer monitor 122. These ringback signals occur in a regular sequence until the called telephone is answered. When the called telephone is answered, the ringback signals cease so that their regular sequence of occurrence is interrupted. This interruption is noted by the answer monitor and it produces a signal on the answer line 126, which is applied to the start terminal 128 of the message motor control circuit 130 to start operation of the message motor 44. The message motor 44 turns the capstan 42 which, in turn, drives the message tape 34. As the message tape 34 moves, its various message tracks pass under the corresponding message pickup heads 30 and the particular head, which has been energized by its message control line 22, will cause the transmission of a message from its associated message track over the common message line 36 to the message transducer 38. This message is then sent out over the alarm telephone line 40 and the trunk line 70. When the message has been played out, the conductive segment 139 on the message tape 34 bridges the brushes 136, causing a signal to appear on the motor stop line 134. This signal is applied to the stop terminal 132 of the message motor control 130 and this, in turn, stops the message motor 44 and the message tape 34.

The signal which appears on the motor stop line 134 is also applied via the third OR gate circuit 142 and the second OR gate 78 to the monostable relay 76. This causes the line clear switch contacts 74 to open, thereby producing an on-hook condition on the telephone lines 70 following the completion of the first alarm message. After the monostable relay resets, the line clear switch contacts 74 close and a signal is applied from the monostable relay via the AND-NOT gate circuit 86 to the closed terminal 84 of the bistable relay 82 and, at the same time, signals from the monostable relay 76 are applied to the open terminal 124 of the answer monitor bistable relay 116 and to the dial tone acquisition timer 98 to initiate the dialing of a subsequent telephone call.

In the event that the called telephone is not answered within the length of time set in the no-answer timer 118, the answer monitor will not produce any signals on the answer line 126 because the regular sequence of ringback signals applied to it have not been interrupted. If this situation persists beyond the timing duration set in the no-answer timer 118, a no-answer signal will be produced on the no-answer line 140. This signal is applied via the third OR gate circuit 142 and the second OR gate circuit 78 to the monostable relay 76, causing it again to open the line clear switch contacts 74 to effect a further on-hook condition so that a subsequent telephone call will automatically be made without any playing of the message tape to the non-answered telephone.

The placement of telephone calls and the playing of messages to those telephones which are answered continues throughout the dial sequence selected by the particular type of alarm situation being broadcast. At the end of this sequence, a signal is produced at the end of seuqnece terminal 92 and applied to the end of seuqence line 90. This signal is simultaneously applied to the inhibit terminal 88 of the AND-NOT gate circuit 86 and to a terminal of the AND gate circuit 96. Thus, at the completion of the last call in the sequence, a signal which passes either from the no-answer timer 118 or from the message motor stop line 134 through the third OR gate 142 and the second OR gate 78 to the monostable relay 76, will cause the relay again to open the contacts 74 to effect an on-hook condition. However, at the completion of this on-hook condition, when the monostable relay 76 resets and produces an output signal, this output signal will pass through the AND-NOT gate 86 because of the inhibit signal present on its inhibit terminal 188. Instead, the signal from the monostable relay 76 will now pass through the AND gate 96 to the opened terminal of the bistable relay 82, thereby causing it to open its line seize switch contacts 80. This removes the alarm system from the telephone lines and, and the same time, allows the telephone lines to be used for normal telephoning purposes.

The end of seuqence signal which appears on the line 90 is also applied to an enable terminal 150 of the bistable relay 66, which controls the various disabled relay contacts 14. This allows the sensors 10 to respond to a subsequent alarm situation.

Figure 2:
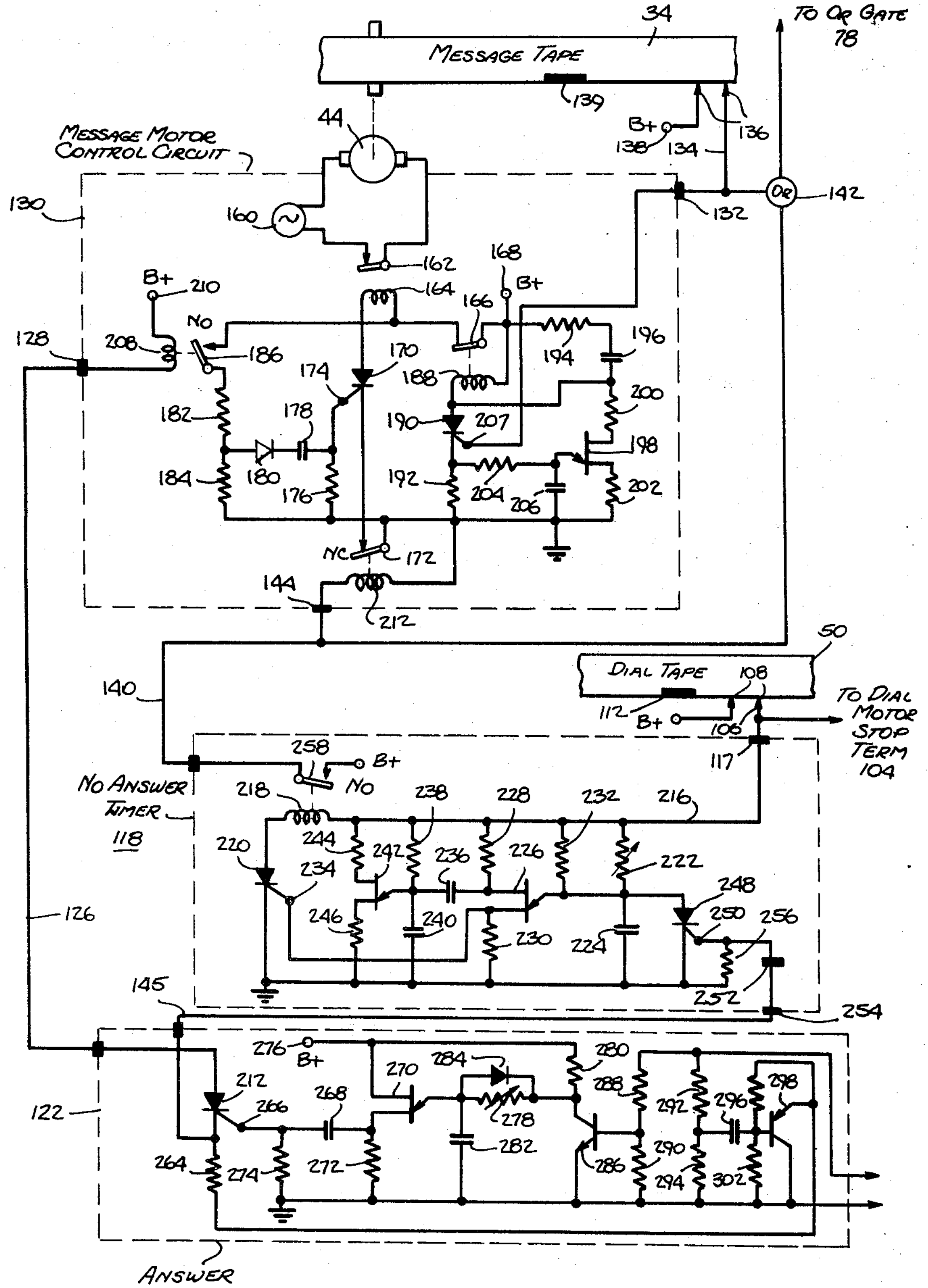
FIG. 2 is a circuit diagram of several components of the telephoning system of FIG. 1.

FIG. 2 illustrates in detail the various circuit configurations and interconnections of and between the no-answer timer 118, the answer monitor 122 and the message motor control circuit 130. These three items are indicated within the respective dashed lines in FIG. 2.

Considering first the message motor control circuit 130, it will be seen that the message motor 44 is connected, in the message motor control circuit 130, to an electrical power source 160 which is in series with a pair of normally open switch contacts 162. These switch contacts are operated from a motor control relay coil 164. This coil is connected on one side through a pair of normally closed motor stop switch contacts 166 to a positive voltage terminal 168, and on the other side, through an SCR switching diode 170 and a pair of normally closed switch contacts 172 to ground potential. The SCR switching diode 170 has a switching gate electrode 174 which is connected to ground potential via a switching gate electrode resistor 176. The switching gate electrode 174 is also connected via a capacitor 178 and a diode 180 to the junction of a pair of resistors 182 and 184. The resistors 182 and 184 are connected in series with a pair of normally open motor start switch contacts 186 and a normally closed motor stop switch contacts 166 to the positive voltage terminal 168.

The normally closed motor stop switch contacts 166 are arranged to be opened by energization of a motor stop relay coil 188. This motor stop relay coil 188 is connected on one side to the positive voltage terminal 168, and on the other side to the anode of a motor stop SCR switching diode 190. The cathode of the SCR switching diode 190 is connected via a switching voltage resistor 192 to ground. The positive voltage terminal 168 is also connected via a delay resistor 194 and delay capacitor 196 in series to the anode of the motor stop SCR switching diode 190. A unijunction transistor 198 is also provided with its base terminals connected, respectively, via resistors 200 and 202 to the anode of the SCR switching diode 190 and to ground. The emitter terminal of the unijunction transistor 198 is connected via a timing resistor 204 to the cathode terminal of the SCR switching diode 190, and a timing capacitor 206 is also connected between the emitter terminal of the unijunction transistor 198 and ground. The SCR switching diode 190 has a switching gate electrode 207 connected to the message motor stop terminal 132 from which it receives a stop signal voltage when the conductive segment 139 on the message tape 34 bridges the brushes 136 upon completion of message playout.

The normally opened motor start switch contacts 186 are controlled by a motor start relay 208 which is connected on one side to a positive voltage terminal 210 and on the other side to the start terminal 128.

The above-described message motor control circuit 130 operates in response to the completion of a circuit within the answer monitor 122, allowing current flow from the positive voltage terminal 210, through the motor start relay 208, a start terminal 128 and the answer line 126. This current flow energizes the relay 208, causing it to close the normally opened motor start switch contacts 86, thereby producing a current flow through the pair of resistors 182 and 184. This, in turn, causes a positive appearing voltage to pass through the diode 180 and the capacitor 178 to the switching gate electrode 174 of the SCR switching diode 170. As a result, the diode 170 becomes conductive and thereby completes a circuit from the positive voltage terminal 168 through the normally closed motor stop switch contacts 166, the motor control relay coil 164, the SCR switching diode 170 and the normally closed inhibit switch contacts 172 to ground potential. The closing of this circuit results in energization of the motor control relay coil 164 which, in turn, closes the normally opened switch contacts 162, thereby allowing the motor 44 to be driven from the electrical power source 160. The motor will continue to drive the message tape 34 until a short time after the electrically conductive segment 139 on the tape bridges the brushes 136. This is to ensure that, at the time the motor is restarted, the conductive segment no longer bridges the brushes; otherwise the motor would not be able to start again.

When the conductive segment bridges the brushes 136, a positive voltage appears at the stop terminal 132. This positive voltage is applied directly to the switching gate terminal of the motor stop SCR switching diode 190, causing this diode to go into a conductive state. Current initially flows from the delay capacitor 196 through the diode 190. However, in a short time the capacitor charge becomes depleted and current is then drawn through the motor stop relay coil 188 and the motor stop SCR switching diode 190. This flow of current energizes the motor stop relay coil 188, causing it to open the normally closed motor stop switch contacts 166. This interrupts the flow of current through the motor control relay coil 164, causing it to become deenergized and allowing the switch contacts 162 to revert to their normally opened condition. This removes the message motor 44 from circuit with the electrical power source 160 so that it will come to a stop.

The motor stop relay coil 188 automatically becomes deenergized a short time after it has effectively stopped operation of the message motor 44. This occurs as a result of a timing seuqence controlled by the timing resistor and capacitor 204 and 206 in conjunction with the unijunction device 198. Upon application of positive voltage through the motor stop terminal 132, current flows through the switching voltage resistor 192, causing it to experience a voltage drop across it. This voltage drop is applied via the timing resistor 204 to the timing capacitor 206. This causes a gradual rise in voltage at the emitter terminal of the unijunction transistor 198. While this voltage rises gradually, the motor stop relay coil 188 remains energized and the normally closed motor stop switch contacts are held open to stop the message motor 44. When the voltage at the emitter of the unijunction transistor 198 reaches the threshold level for the device, the device begins immediately to conduct and this, in turn, diverts current flow from the motor stop SCR switching diode 190 so that it reverts to a non-conducting condition. Soon after this occurs, the timing capacitor 206 becomes discharged through the emitter of the unijunction transistor 198; and the unijunction transistor reverts to a non-conducting state. As a result, current flow through the motor stop relay 188 ceases and the relay becomes deenergized.

As indicated previously, the motor 44 is caused to start driving the message tape 34 when the answer monitor 122 operates to allow current to flow through the answer line 126 from the start terminal 128 of the message motor control circuit 130. This occurs when the answer monitor senses the answering of the called telephone. In the event that the called telephone is not answered within a predetermined length of time following the dialing operation by which it is called, the no-answer timer 118 will produce a signal on the no-answer line 140 which is applied to the inhibit terminal 144 of the message motor control circuit 130. The application of a signal to this terminal will prevent any subsequent action by the answer monitor 122 from causing the motor 44 to start operation. This occurs by virtue of the fact that the application of a voltage to the inhibit terminal 144 causes energization of the inhibit relay 212 which, in turn, opens the normally closed inhibit switch contacts 172. This interrupts the circuit from the positive voltage terminal 168 through the motor control relay coil 164 and the SCR switching diode 170, thereby preventing energization of the motor control relay coil 164. Thus, any subsequent action by the answer monitor 122 is effectively nullified.

The inhibit terminal 117 of the no-answer timer 118 is connected to the dial motor stop line 106. The input terminal 117 is also connected to a common positive voltage line 216 which, in turn, is connected to an output relay coil 218. The relay coil 218, in turn, is connected through a timer-triggered SCR switching diode 220 to ground potential. A timing arrangement is provided in the no-answer timer 118 and this comprises an adjustable resistor 222 and a timing capacitor 224, which are connected in series between the common positive voltage line 216 and ground potential. The junction between the resistor and capacitor is connected to the emitter terminal of a unijunction device 226. The two base terminals of the unijunction device 226 are connected, respectively, through resistors 228 and 230 to the common positive voltage line 216 and ground potential. The emitter of the unijunction device 226 is also connected through a resistor 232 to the common positive voltage line 216. The lowermost base terminal, i.e., that connected to the resistor 230 to ground potential, is also connected to a switching gate electrode 234 of the timer-triggered SCR switching diode 220. The other base electrode of the unijunction device 226 is connected through a capacitor 236 to a junction between a further resistor and capacitor 238 and 240 which, in turn, are connected in series between the common positive voltage line 216 and ground potential. The junction between the further resistor and capacitor 238 and 240, in turn, is connected to the emitter of a second unijunction device 242, and the base terminals of this device are connected, respectively, through resistors 244 and 246 to the common positive voltage line 216 and ground potential.

A further SCR switching diode 248 is connected in parallel with the timing capacitor 224. The switching diode 248 also contains a switching gate electrode 250 which is connected through an input capacitor 252 to an inhibit terminal 254. A drainage resistor 256 connects the switching gate 250 to ground potential.

The output relay coil 218 is arranged to close a pair of normally opened switch contacts 258 which are interposed between a positive voltage source 260 and the no-answer line 140.

The no-answer relay coil 218 is arranged to close a pair of normally opened switch contacts 258 which are interposed between a positive voltage source 260 and the no-answer line 140.

The no-answer timer is put into operation upon completion of the dialing of a called number. If the dialed telephone is not answered within a predetermined time established by the setting of the adjustable resistor 222, then the output relay coil 218 becomes energized and closes the switch contacts 258, thereby applying a positive voltage from the source 260 to the no-answer line 140. As indicated previously, this voltage is applied to the inhibit terminal of the message motor control circuit 130 to prevent the message motor from going into operation. At the same time, a signal is applied via the OR gate 142 and the OR gate 178 to initiate the placing of a subsequent telephone call. In the event that the called telephone does answer before the timing established by the setting of the adjustable resistor 222 has been completed, then the answer monitor 122 will apply a positive going impulse via the inhibit terminal 254 to the switching gate electrode 250 of the further SCR switching device 248, and, as will be explained, this will prevent any subsequent energization of the output relay coil 218 and consequent imposition of a positive voltage on the no-answer line 140.

Upon the completion of a dialing operation, the electrically conductive segment 112 on the dial signal tape 50 bridges the dial stop brushes 108 and applies a positive potential via the dial motor stop line 106 to the input terminal 214. This, in turn, causes a positive voltage to apear on the common positive voltage line 216. However, current will not flow through the output relay coil 218 until the timer-triggered SCR switching diode 222 has received a positive pulse at its switching gate electrode 234. When a positive voltage is applied to the common positive voltage line 216, current beings to flow through the adjustable resistor 222 into the timing capacitor 224 and the voltage at the emitter terminal of the unijunction device 226 begins to rise in a gradual manner. The rate of this voltage rise is adjusted by adjustment of the resistor 222. In practice, the rise may be set to reach the triggering voltage of the unijunction device 226 after a period of time comparable to approximately that required for nine ringback signals to occur. In most cases, if a telephone has not been answered after this number of rings, it may be decided that it will not be answered at all and the system should proceed to the next subsequent call. Of course, this may be adjusted depending upon the circumstances and the timing may be set for a greater or lesser number of rings to occur.

If while the voltage at the emitter terminal of the unijunction device 226 rises toward the unijunction triggering potential, the answer monitor 122 indicates that the telephone being called has been answered, a positive going voltage impulse appears upon the inhibit terminal 254 and this, in turn, is communicated to the switching gate electrode 250 of the further SCR switching diode 248. This impulse places the switching diode 248 into a conductive condition and allows the timing capacitor 224 to discharge through it. As a result, the voltage potential at the emitter terminal of the unijunction device 226 is prevented from rising to the triggering or breakdown level for the unijunction device.

In the event that the called telephone is not answered, then the answer monitor 122 will fail to present an inhibit signal at the inhibit terminal 254 of the no-answer timer 118. Consequently, the further SCR switching diode will not short-circuit the timing capacitor 224 and its voltage will increase the voltage at the emitter terminal of the unijunction device 226. Eventually, the unijunction device 226 will be rendered conductive and current will flow through the resistors 228 and 230. This causes a voltage rise to occur at the base terminal of the unijunction device, which is connected to the resistor 230 and this voltage rise is communicated to the switching gate electrode 234 of the timer-triggered SCR switching diode 220, causing it to switch to a conductive state. As a result, current flows through the common positive voltage line 216 through the output relay coil 218 and the SCR switching diode 220. This energizes the output relay coil 218, causing the normally opened switch contacts 258 to close and this, in turn, imposes a positive voltage from the voltage source 260 onto the no-answer line 140.

A short time after the relay 218 is energized, it is deenergized so that the switch contacts 258 will again revert to their normally opened condition. This deenergization is controlled by the further unijunction device 242 in conjunction with a timing arrangement comprising the further resistor 238 and further capacitor 240. When the first unijunction device 226 is triggered into its conductive state by the rise of voltage at its emitter terminal, for triggering the SCR switching diode 220, the base terminal of the first unijunction device 226, which is connected to the resistor 228, undergoes a sudden voltage drop; and this voltage drop is communicated via the capacitor 236 to the junction between the further resistor 238 and the further capacitor 240. The voltage at this junction rises gradually as current flows through the resistor 238 from the common positive voltage line 216 and into the further capacitor 240. Eventually, the voltage at this junction, which is applied to the emitter of the further unijunction device 242, reaches the triggering level for the unijunction device, causing it to conduct. As a result, a sudden flow of current takes place through the resistors 244 and 246 via the unijunction device 242. This diversion of the flow of current from the relay coil 218 causes the SCR switching diode 220 to revert to a non-conducting condition. Thus, it will be appreciated that the no-answer timer 118, after triggering to impose a positive voltage on the no-answer line 140, automatically reverts to a non-conducting condition following the production of this signal.

The answer monitor 22, as indicated previously, responds to ringback signals which appear across the alarm telephone lines 40 following a dialing operation to produce a signal which is effective to start operation of the message motor 44. This signal, in the illustrative embodiment, is the establishment of a ground connection so that current will begin to flow from the positive voltage terminal 210 through the motor start relay 208 and the answer line 126 to ground potential. It will be understood from a consideration of the circuit configuration of the message motor control circuit 130 that the SCR switching diode 170 is not maintained in conduction by the holding of the motor start switch contacts 186 in closed condition. In other words, the switch contacts 186, if held closed following opening of the normally closed inhibit switch contacts 172 or the normally closed motor stop switch contacts 166, the sCR switching diode will not be placed again in conductive condition merely upon closure of the switch contacts 172 and 166. This is because the capacitor 178 prevents the positive voltage at the switch contacts 186 from being applied to the switching gate electrode 174. The SCR switching diode 170 is put into conduction only by the opening and subsequent closing of the motor start switch contacts 186. It is this subsequent closing which causes a positive voltage impulse to be applied to the gate electrode 174 of the SCR switching diode 170.

In the normal or quiescent state while the message motor control circuit 130 awaits a signal which is effective to place the message motor 44 into operation, current flows continuously from the positive voltage terminal 210 and through the motor start relay 208 and through the answer line 126 to the answer monitor 122. This flow of current maintains the motor start relay 208 in its energized condition so that the motor start switch contacts 186 remain closed. The sCR switching diode 170, however, remains in a non-conductive condition because the voltage at its switching gate electrode 174 remains at ground potential via the resistor 176. The message motor 44 is started by first deenergizing the motor start relay 208 and then subsequently reenergizing it. This reenergization and consequent reclosing of the switch contacts 186 imposes a positive going voltage pulse on the switching gate electrode 174, which places the SCR switching diode 170 into conductive condition and energizes the motor control relay coil 164.

The answer monitor 122 includes an SCR switching diode 262, the anode of which is connected directly to the answer line 126 and the cathode of which is connected via an SCR resistor 264 to ground potential. The SCR switching diode 262 is provided with a switching gate terminal 226 which is connected via a capacitor 268 to one base terminal of a unijunction device 270. This same base terminal is also connected via a unijunction resistor 272 to ground potential. The switching gate terminal 266 is also connected via a resistor 274 to ground potential. The remaining base terminal of the unijunction device 270 is connected to a positive voltage source 276. The emitter of the unijunction device 270 is connected through an adjustable resistor 278 and a fixed resistor 280 to the positive voltage source 276. The emitter terminal of the unijunction device 270 is also connected via a timing capacitor 282 to ground potential. A diode 284 is connected to bypass the adjustable resistor 278 and is positioned for conduction in a direction away from the emitter of the unijunction device 270. The junction between the fixed and the adjustable resistors 278 and 280 is connected to the collector of an NPN type ringback reset transistor 286. The emitter of this transistor is connected directly to ground potential.

One side of the alarm telephone line 40 is connected directly to ground potential, while the other side is connected to a pair of voltage divider circuits. The first voltage divider circuit comprises first and second resistors 288 and 290 connected in series across the alarm telephone line 40. The junction between the two resistors 288 and 290 is connected to the base electrode of the ringback reset transistor 286; and when no voltage appears at this junction, the transistor remains non-conductive. A positive voltage at the junction will, however, render the transistor 286 conductive.

The other voltage divider circuit comprises third and fourth resistors 292 and 294, also connected in series across the alarm telephone line 40. The junction between the third and fourth resistors 292 and 294 is connected via a capacitor 296 to the base electrode of an NPN type call reset transistor 298. The emitter of the transistor is connected directly to ground potential while its collector is connected via the SCR resistor 264, to the cathode of the SCR switching diode 262. The emitter of the call reset transistor 298 is also connected to ground via a further series of resistors 300 and 302 which form a voltage divider circuit. This circuit biases the base of the call reset transistor so that the transistor is normally in a conductive state.

The junction between the SCR switching diode 262 and the SCR resistor 264 is connected to the no-answer inhibit line 145 and from there to the inhibit terminal 254 of the no-answer timer 118.

When the answer monitor 122 is in a quiescent state, the SCR switching diode 262 is in its conductive condition and current flows through it from the answer line 126. As indicated above, this current maintains the start relay 208 in the motor control circuit 130 energized so as to hold the switch contacts 186 in a closed condition. This alone, however, as indicated previously, is insufficient to cause energization of the motor control relay 164.

After a telephone number has been dialed, ringback signals begin to appear on the alarm telephone lines 40 in a regular sequence until the dialed telephone has been answered or until a predetermined time interval has elapsed. Thse ringback signals, which occur as voltage pulses across the alarm telephone lines 40, operate via the voltage divider resistors 288, 290, 292 and 294 to place the ringback reset transistor 286 into a conductive state and the call reset transistor 298 into a non-conductive state. When the transistor 298 is rendered non-conductive by the occurrence of the first of these ringback signals, it serves to interrupt the flow of current through the SCR switching diode 262 and thereby turns this switch off so that the motor start relay 208 becomes deenergized.

The effect of the ringback pulses on the ringback reset transistor 286 is to render it conductive. This allows any charge on the timing capacitor 282 to drain off via the diode 284 and the transistor 286. Thereafter, during the interval between successive ringback pulses (when the ringback reset transistor 286 is non-conductive), the capacitor 282 receives a gradually increasing charge via the adjustable resistor 278 and the fixed resistor 280 from the positive voltage source 276. The adjustable resistor 278 is set to control the rate of charge to the timing capacitor 282 such that during the interval between successive ringback signals it does not reach the trigger potential of the unijunction device 270. Thus, when the next successive ringback signal occurs, the charge which has been built up on the timing capacitor 282 is again discharged through the diode 284 and the ringback reset transistor 286.

When the called telephone is answered, the ringback signals cease to occur. Thus, in the absence of any signal rendering the ringback reset transistor conductive, the charge on the timing capacitor 282 continues to build up until it reaches the trigger potential of the unijunction device 270. When the unijunction device fires,a pulse is transmitted via the capacitor 268 to the switching gate terminal 266 of the SCR switching diode 262. This causes the diode to conduct, thereby establishing a path to ground potential from the motor start relay 208. The relay then energizes to close the motor start switch contacts 186 which, in turn, initiates the operation of the message motor 44. Thus, it will be appreciated that the message motor is started as soon as the regular sequence of ringing signals is interrupted.

When the SCR switching diode 262 is rendered conductive, a positive voltage appears on the no-answer inhibit line 145; and this voltage is applied to the inhibit terminal 254 of the no-answer timer 118. As explained above, this prevents the no-answer timer from operating to initiate the placement of a call to a different telephone.

Figure 3:
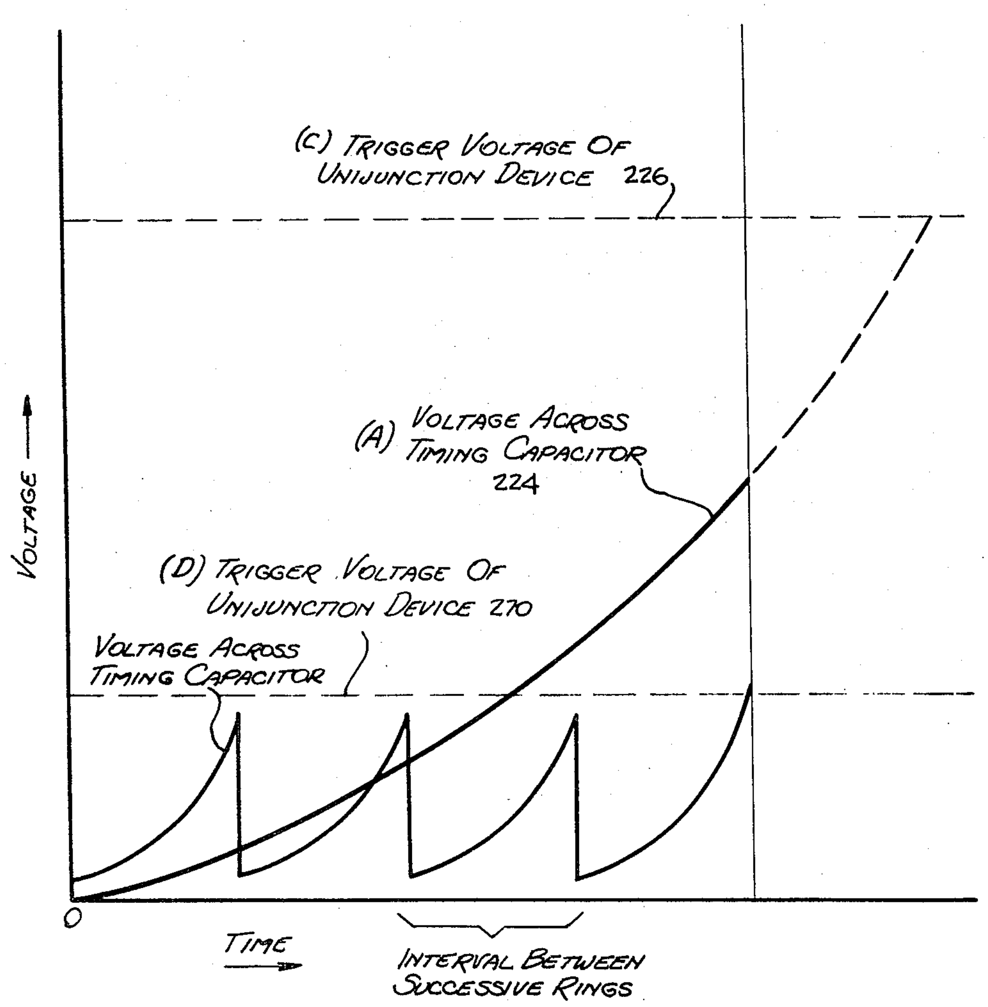
FIG. 3 is a set of voltage waveforms taken at selected locations in the circuit of FIG. 2 for illustrating the operation of the system.

The waveforms of FIG. 3 are useful in analyzing the operation of the no-answer timer 118 and the answer monitor 122. As can be seen in FIG. 3, curve (A), which represents the voltage across the timing capacitor 224 in the no-answer timer 118, begins to rise from a starting point O at the end of a dialing operation when the electrically conductive segment 112 on the dial tape 50 bridges the dial stop brushes 108. This voltage rises gradually toward the trigger voltage of the unijunction device 226, indicated by the upper horizontal dashed line C. Shortly after dialing has been completed, a series of ringback signals appears across the alarm telephone lines 40. The first of these signals causes a voltage rise to begin, as shown at point P, across the timing capacitor 282 of the answer monitor 122. This voltage continues to rise toward the trigger voltage of the unijunction device 270, indicated by the lower horizontal dashed line D. When a subsequent ringback signal occurs to render the ringback reset transistor 286 conductive, the capacitor 282 discharges and the voltage across it drops. After each ringback signal, the voltage across the capacitor 282 begins to rise again so that a sawtooth voltage waveform (B) is produced across the capacitor.

If the called telephone is answered before the voltage charge across the capacitor 224 in the no-answer timer 118 reaches the trigger potential of the unijunction device 226, the charge across the capacitor 282 will rise to the trigger voltage level of the unijunction device 120 to start the message motor operation. At the same time, as explained above, the no-answer timer is rendered inactive.

It will be appreciated that the system described herein provides effective automatic telephoning in that it responds directly to the answering of a called telephone to broadcast a message, and the message is not broadcast unless or until the called telephone is answered. Furthermore, the system requires no special equipment at the called telephone so that it may be set to call any telephone with similar automatic operation.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended hereto.

What is claimed is:

1. In a system for automatically placing telephone calls, the combination of dialing means operative to dial a called station, message means operative to transmit a recorded message over a telephone line to the called station, a ringback signal monitor connected to said telephone line and responsive to each of several successive ringback signals which occur on said line following operation of said dialing means, said ringback signal monitor including timer means connected to be reset by each ringback signal to separately measure each of the durations between the successive ringback signals and to produce an output signal when any of said durations exceeds a predetermined amount, and means responsive to said output signal to cause said message means to begin playout of said recorded message whereby said message is heard from its beginning at the called station whenever the called station answers.

2. In a system according to claim 1, wherein said system further includes a second timer resettable in response to completion of operation of said dialing means, means for initiating further operation of said dialing means in response to a predetermined output from said second timer and means for disabling said second timer in response to outputs from said ringback signal monitor which initiate operation of said message means.

3. In a system according to claim 1, further including means for initiating further operation of said dialing means in the absence of message means playout after a predetermined length of time following completion of a preceding operation of said dialing means.

4. In a system according to claim 3, wherein said means for initiating further operation of said dialing means comprises a timer and means for resetting said timer upon completion of each dialing operation.

5. In a system according to claim 1, wherein said timer means is set to a given duration slightly greater than the interval between successive ringback signal occurrences.

6. In a system for automatically placing telephone calls, the combination of dialing means operative to dial a series of telephone numbers over telephone lines according to a selected sequence, message broadcast means operative to broadcast a message over said telephone lines, a first timer operative after a first predetermined duration following resetting to initiate operation of said message broadcast means, a second timer operative after a second, longer, predetermined duration following resetting to initiate operation of said dialing means to dial a subsequent number in said sequence, means operative to reset said first timer in response to the occurrence of ringback signals on said telephone lines and means operative to reset said second timer upon completion of the dialing of a telephone number by said dialing means.

7. In a system according to claim 6, further including means operative to disable operation of said message broadcast means in response to outputs from said second timer.

8. In a system according to claim 6, further including means operative to disable said second timer in response to outputs from said first timer.

9. In a system according to claim 6, further including means operative to disable operation of said message broadcast means in response to outputs from said second timer and means operative to disable said second timer in response to outputs from said first timer.

* * * * *